United States Patent
Gordon (10) Patent No.: US 8,266,810 B2
(45) Date of Patent: Sep. 18, 2012

(54) SYSTEM AND METHOD FOR QUICK AND ACCURATE TRAMMING

(76) Inventor: Sean Edward Gordon, Evansville, IN (US)

( * ) Notice: Subject to any disclaimer, the term of this patent is extended or adjusted under 35 U.S.C. 154(b) by 0 days.

(21) Appl. No.: 12/957,014

(22) Filed: Nov. 30, 2010

(65) Prior Publication Data

US 2011/0131826 A1    Jun. 9, 2011

Related U.S. Application Data

(60) Provisional application No. 61/267,517, filed on Dec. 8, 2009.

(51) Int. Cl.
*G01B 5/25* (2006.01)
(52) U.S. Cl. .......................................... 33/502
(58) Field of Classification Search .............. 33/502, 33/568, 573, 613, 636, 638, 642, 643, 645, 33/792
See application file for complete search history.

(56) References Cited

U.S. PATENT DOCUMENTS

| 4,006,529 | A  | * | 2/1977  | Herman .......................... 33/573 |
| 4,406,069 | A  |   | 9/1983  | Clement |
| 6,583,869 | B1 | * | 6/2003  | Sheridan ....................... 356/153 |
| 6,832,440 | B2 |   | 12/2004 | Navarro, Sr. et al. |
| 7,069,666 | B2 |   | 7/2006  | Navarro et al. |
| 7,464,478 | B2 | * | 12/2008 | Adrian ............................ 33/286 |

* cited by examiner

*Primary Examiner* — G. Bradley Bennett
(74) *Attorney, Agent, or Firm* — Lyman H. Moulton, Esq.

(57) ABSTRACT

A system and method for quick and accurate tramming are disclosed. The system includes an apparatus comprising a plurality of indicators spaced apart in a plane perpendicular to a body shank and connected thereto, the body shank configured to be received into the spindle. The system also includes a calibration device configured to temporarily remain fixed in place on the mill table to provide a single point of calibration for each indicator received in the apparatus. The method includes calibrating the indicators one at a time by positioning an indicator shank tip atop the calibration device and adjusting the indicator to read a calibration value common to all the indicators. The spindle is moved toward the mill table until at least one indicator tip touches the mill table and the mill head is adjusted until all indicator tips touch the mill table and all indicators read the same value.

20 Claims, 7 Drawing Sheets

SYSTEM AND METHOD FOR QUICK AND ACCURATE TRAMMING

CROSS-REFERENCE TO RELATED APPLICATION

This application claims the benefit of the priority date of earlier filed U.S. Provisional Patent Application Ser. No. 61/267,517, filed Dec. 8, 2009 incorporated herein by reference in its entirety.

BACKGROUND OF THE INVENTION

Tramming a mill head is the process of adjusting a milling machine's mill head and spindle to be precisely perpendicular to a tool holding work surface or mill table. Typically, the tool holding spindle is vertical and the mill head is horizontal in a vertical milling machine. The tool holding spindle extends out of the mill head to adjust cutter depth and controls movement of the tool relative to the mill head surface. The mill table holds or disposes a work product to be shaped, drilled and otherwise formed by the tool. Perpendicularity assures that the action of the tool on the work product is predictable but other angles between the tool spindle and the mill head may be used when desired.

Tramming a mill head to the mill table is not only necessary in the initial setup of a milling machine but also necessary in the periodic maintenance over the life of the machine. Conventional tramming techniques involve rotating a test gauge held in an arm adapter in the spindle for measuring the precise distance between the test gauge and multiple points on the mill table. The angle of the mill head's upright support is adjusted until there are no differences in the test gauge readings. This requires iteratively adjusting the mill head for each point by half the difference between any two points until all points on the mill table read the same distance from the test gauge. This lengthy process not only requires skill, proper tools, techniques and methods but also a lot of time.

Tramming is usually preformed by the machinist prior to and during large amounts of work or prior to especially precise work. Time taken in tramming a milling machine comes out of the productive time a machinist has to produce a work product. Therefore, the longer it takes to tram a machine, the less time a machinist has to produce work product. A system and method which speeds up the tramming process with the same or better accuracy compared to conventional techniques will enable the machinist to be more productive and profitable and even produce superior products.

SUMMARY OF THE INVENTION

A System and Method for Quick and Accurate Tramming of a milling machine head and spindle to a mill table is disclosed. The system includes an apparatus comprising a plurality of indicators spaced apart in a plane perpendicular to a body shank and connected thereto, the body shank configured to be received into the spindle. The system also includes a calibration device configured to temporarily remain fixed in place on the mill table, the device configured to provide a single point of calibration for each indicator received in the apparatus. The calibration device may be a magnet and any other device capable of temporarily remaining fixed in a predetermined place on the mill table during calibration. The indicators may comprise mechanical, electro-mechanical or laser measuring devices.

The disclosed Method for Quick and Accurate Tramming includes disposing an apparatus body shank into the spindle and fixing in place a calibration device onto the mill table, the apparatus body comprising a plurality of indicators spaced apart in a plane perpendicular to the body shank and connected thereto. The method also includes calibrating the indicators one at a time by positioning a shank tip of an indicator until resting atop the calibration device and adjusting the indicator to read a calibration value common to all the indicators. The method further includes moving the spindle toward the mill table surface until at least one indicator tip touches the mill table and adjusting the mill head until all the indicator tips touch the mill table and all indicators read a same value.

Although specific compositions of the present disclosure have been described and typical moving parts illustrated, the invention is not to be limited to the specific forms or arrangements of parts so described and illustrated. The scope of the disclosure is to be defined by the description appended hereto and the claims and their equivalents to be set forth in a non-provisional application referencing this provisional application.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification herein and claims to be set forth in the non-provisional application.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Human error in the measuring and adjusting of multiple points one-by-one on a mill head and the large amounts of time necessary to do so is eliminated with the disclosed tramming methods and systems. In fact, machine irregularities such as a small burr in the collet of the spindle or worn mill head controls cancel out as a result of the disclosed method and system as explained below. The disclosure thus described and claimed below applies equally as well to conventional vertical milling machines and to less conventional vertical mill heads and horizontal tool holding spindles.

Figure 1:
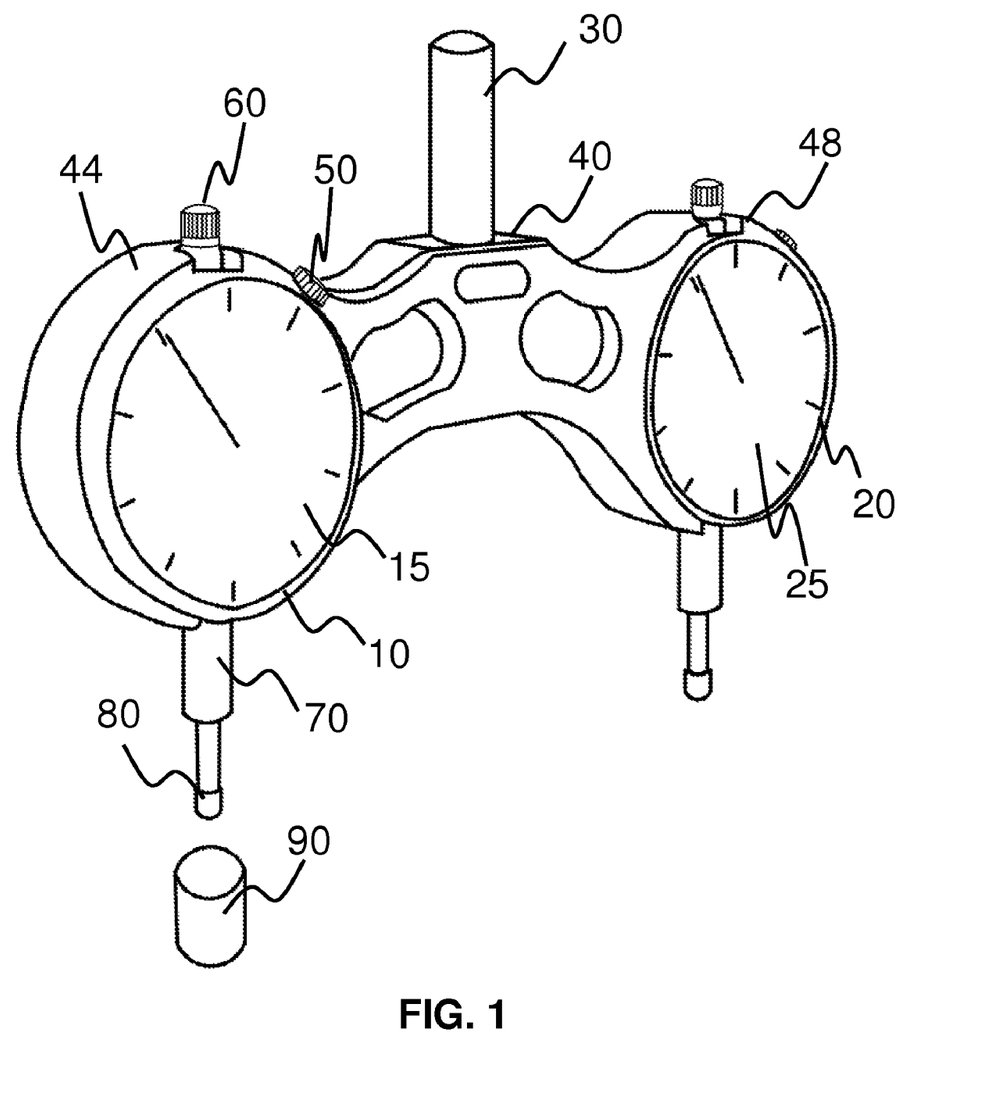
FIG. 1 depicts a perspective view of a system for quick and accurate mill head tramming in accordance with an embodiment of the present disclosure.

FIG. 1 depicts a perspective view of a system for quick and accurate mill head tramming in accordance with an embodiment of the present disclosure. The system includes a first indicator 10, a second indicator 20, a body shank 30, a body 40, a set screw 50, an indicator shank top 60, an indicator shank 70, an indicator shank tip 80 and a calibration device 90. The indicators 10 and 20 are spaced apart in a plane perpendicular to the body shank 30 and are connected thereto via two arms comprising the body 40. The body shank 30 is configured to be received into the spindle of the milling machine mill head (not shown). The body shank 30 may have a nominal diameter of one-half inches to be compatible with the spindle of most milling machines.

The calibration device 90 is configured to temporarily remain fixed in place on the mill table (not shown) and therefore provide a single point of calibration for each indicator 10 and 20 received in the apparatus. The calibration device 90 may be a magnet and any other device capable of temporarily remaining fixed in a predetermined place on the mill table during calibration. The calibration device 90 may also be machined to wring to the mill table with a very light film of oil substantially excluding any air between the device and the mill table. The alignment of an ultrasmooth calibration device on the mill table surface in this manner permits a molecular attraction to occur between the two surfaces and forms a bond. In embodiments, sticky and tacky substances may be used to fix the calibration device 90 temporarily to the mill table at a predetermined location. The calibration device 90 depicted is cylindrical but may also be of bar shape, rectangular or of some arcuate and geometrical configuration in other embodiments of the disclosure including a puck, a pyramid and a cone. The dimensions of the calibration device 90 may vary and the magnetic strength of the magnet may also vary. In fact, in alternate embodiments of the disclosed system and method, other materials may be used to form a calibration device 90 which may temporarily adhere to a mill head surface. The calibration device 90 has a bottom surface and a top surface and a length/height exceeding a length of an indicator shank/extension 70. Smaller top surfaces allow greater accuracy in the tramming method disclosed. The smaller the top surface the more nearly a singular fixed point is provided for calibration of the multiple indicator gauges. In embodiments of the disclosed calibration device, the top surface therefore approximates a single fixed point of calibration. The bottom surface area of the calibration device may vary to increase adhesion to the mill head without any direct effect to the top surface.

The body 40 and the body shank 30 comprising the tramming apparatus are manufactured, marketed and sold by EDGE TECHNOLOGY™ and are of proprietary design. The body 40 may comprise two arm-like extensions 44 and 48 extending from the body shank 30. The arm-like extensions 44 and 48 may be configured such that a distance from a centerline of a first indicator to a centerline of the spindle is substantially equal to a distance from a centerline of a second indicator to the centerline of the spindle. The pair of arm-like extensions 44 and 48 may be spaced apart at 180 degrees and may be configured to receive a backside of the indicators 10 and 20 affixed into a respective recess thereof, a frontside of each indicator having an indicating face 15 and 25 respectively. Embodiments of the disclosure may also include three arm-like extensions spaced apart at 120 degrees.

The indicators 10 and 20 may comprise mechanical, electro-mechanical or laser devices for measuring distances. The indicators are most commonly mechanical gauges with precisely similar features. Indicator 10 may be received into the body 40 and set in place by set screw 50. The indicator shank 70 measures precise distances via a physical extension to a disparate surface. However, laser indicators may measure a precise distance via a laser extending from the indicator atop a disparate surface. Five inches or more separation between the two indicators allows more precise tramming. In fact, a separation equal to the width of the mill table will produce the most accurate tramming of the mill head in an embodiment. The body 40 is also designed such that an indicator shank 70 is substantially parallel to the body shank 30. The indicator shank 70 may be pulled up directly by grasping the indicator shank top 60.

Figure 2:
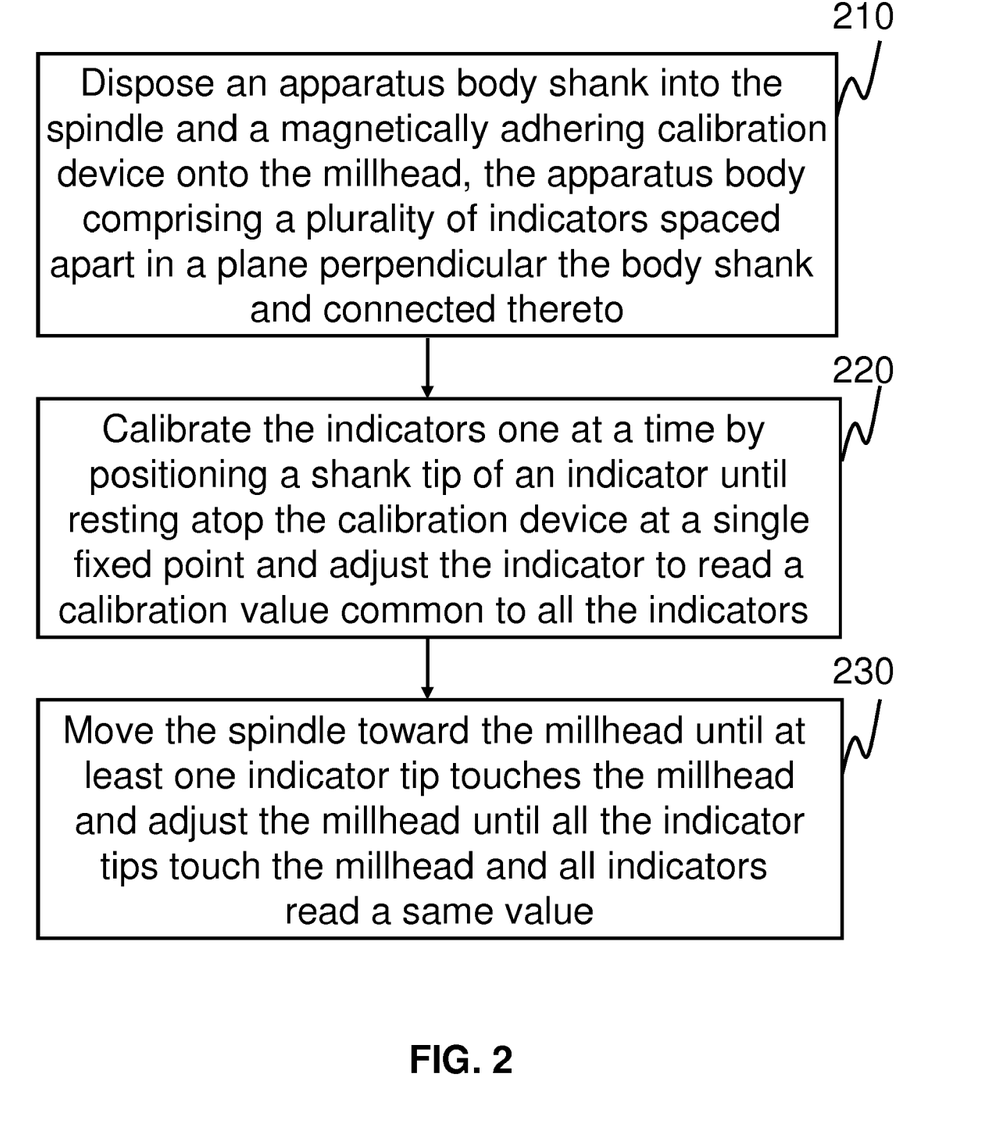
FIG. 2 is a flow chart depicting a method for quick and accurate tramming of a mill head in accordance with an embodiment of the present disclosure.

FIG. 2 is a flow chart depicting a method for quick and accurate tramming of a mill head in accordance with an embodiment of the present disclosure. The embodied method includes 210 disposing an apparatus body shank into the spindle and a magnetically adhering calibration device onto the mill table, the apparatus body comprising a plurality of indicators spaced apart in a plane perpendicular to the body shank and connected thereto. The method also includes 220 calibrating the indicators one at a time by positioning a shank tip of an indicator at a single fixed point atop the calibration device and adjusting the indicator to read a calibration value common to all the indicators. The method further includes 230 moving the spindle toward the mill table until at least one indicator tip touches the mill table and adjusted the mill head until all the indicators read a same value. The calibration device 90 may be removed in step 230 or it may remain on the mill table as long as it does not interfere with the tramming of the spindle to the mill table.

Embodiments of the disclosed method include reposing the calibration device a radial distance from a centerline of the spindle 90 degrees from a prior placement and repeating steps 220 and 230 to tram the mill head in a second plane perpendicular to the mill table. The calibration value read for all indicators may be zero with a repeatability tolerance of plus or minus 0.0002 inches. Also, the mill head may subsequently be adjusted so that at least one indicator reads a predetermined non-calibration value for a predetermined mill head angle with respect to a perpendicular line of the mill table. The aforementioned angle may be determined using the conventional sine rule. The disclosed method for calibrating the indicators affectively cancels out any offset of the indicator in the apparatus body, such as an offset resulting from a bent indicator shank by adjusting all indicators to read the same calibrating value.

Figure 3:
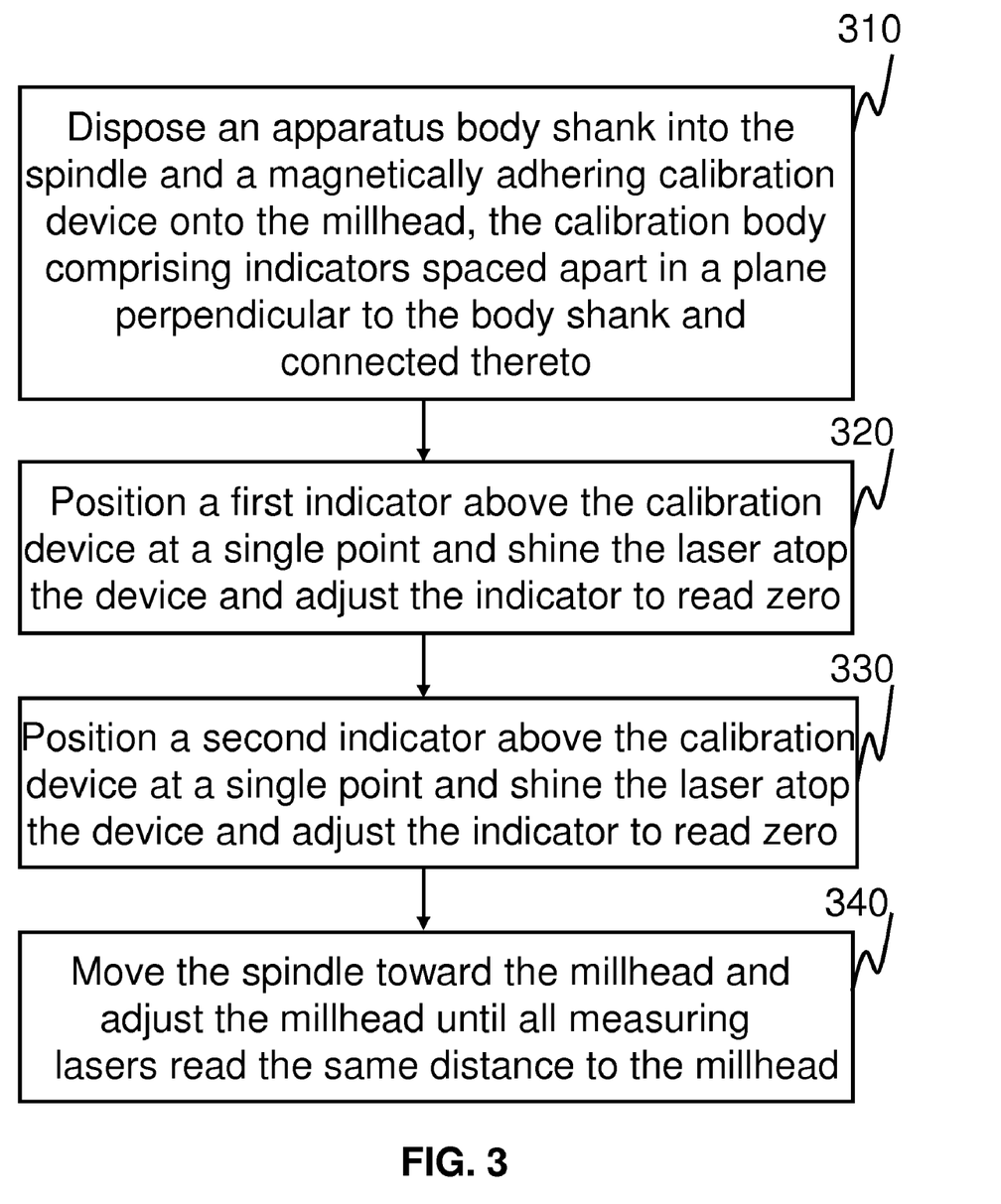
FIG. 3 is a flow chart depicting a method for quick and accurate tramming of a mill head in accordance with an embodiment of the present disclosure including electronic indicators employing laser technology.

FIG. 3 is a flow chart depicting a method for quick and accurate tramming of a mill head in accordance with an embodiment of the present disclosure including electronic indicators employing laser technology. The method includes 310 disposing an apparatus body shank into the spindle and a magnetically adhering calibration device onto the mill table, the apparatus body comprising a plurality of indicators spaced apart in a plane perpendicular to the body shank and connected thereto. The method also includes 320 positioning a first indicator above the calibration device and shinning a laser from the first indicator at a single fixed point atop the calibration device and adjusting the first indicator to read zero, the laser configured to precisely measure a distance from the first indicator to the top of the calibration device. The method additionally includes 330 positioning a second indicator above the calibration device and shining a laser from the second indicator atop the calibration device at the single fixed point and adjusting the second indicator to read zero, the second laser also configured to precisely measure a distance from the indicator to the top of the calibration magnet. The method further includes 340 moving the spindle toward the mill table surface and adjusting the mill head until all measuring lasers read the same distance to the mill table. It may be unnecessary to move the spindle toward the mill table before adjusting the mill head depending on the range and accuracy of the indicator lasers.

Figure 4:
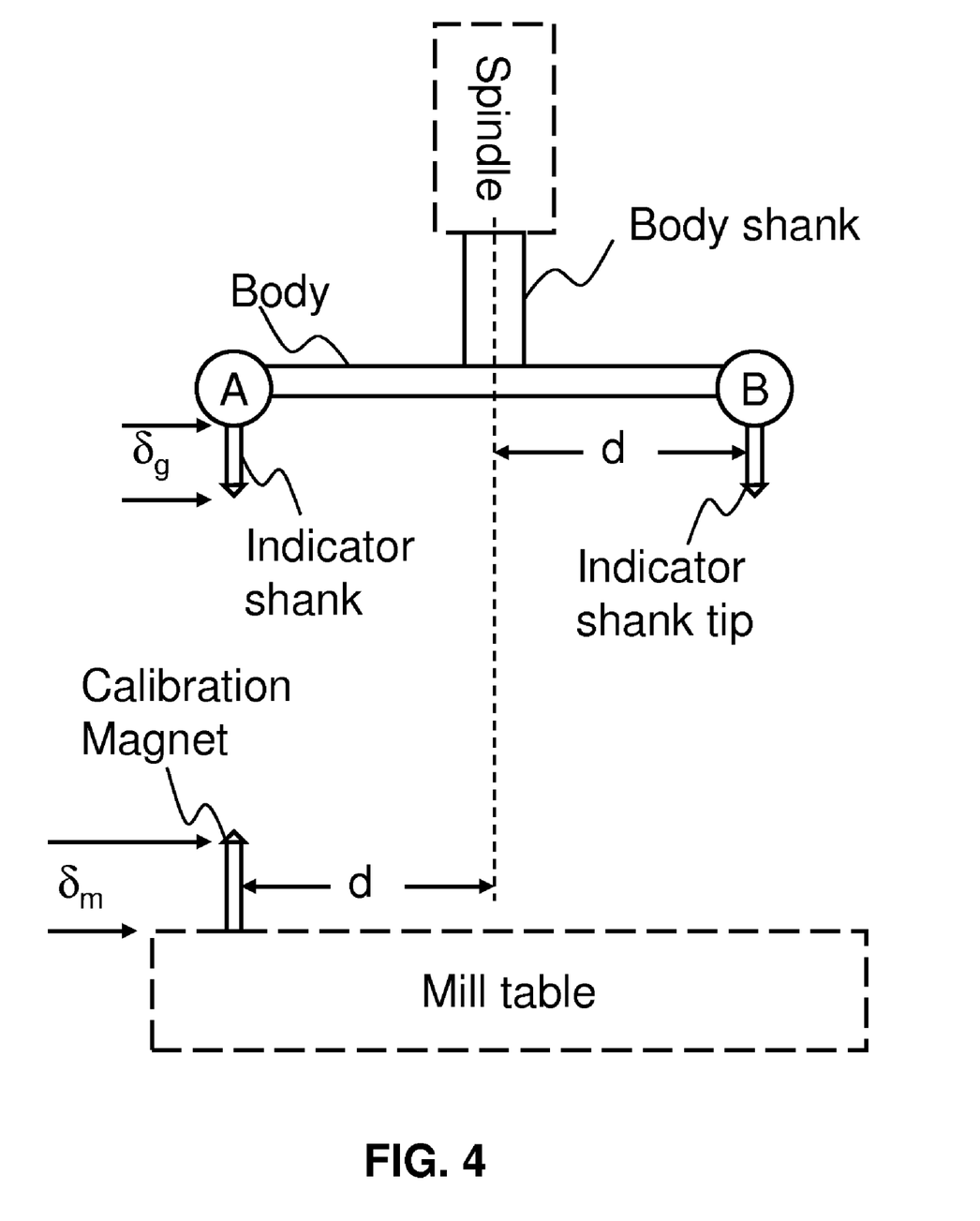
FIG. 4 is a schematic representation of an embodiment of the disclosed system in relation to a spindle and a mill table.

FIG. 4 is a schematic representation of an embodiment of the disclosed system in relation to a spindle and a mill table shown in dashed lines. The spindle is shown substantially vertical and the mill table substantially horizontal in relation to each other. A calibration magnet is disposed upon the mill table such that the bottom surface of the calibration magnet adheres to the mill table surface and fixes it in place for calibration. Also, the top surface of the calibration magnet provides a point to place an indicator shank tip thereon. The distance delta m is the length of the calibration magnet. The calibration magnet is also placed within a distance d of the spindle center axis as shown by the dashed vertical line. The distance d is also approximately equal to the distance from the center of the body shank to the center of indicator A or indicator B and thus to the center of a respective indicator shank.

The body shank is received within the spindle so that the body shank is substantially parallel to the spindle. This sets up the body to be substantially parallel to the mill table. The distance delta g is the length of the indicator shank. The calibration magnet length exceeds the indicator shank length so to avoid an indicator shank from bottoming out on the mill table surface as shown in FIG. 5.

Figure 5:
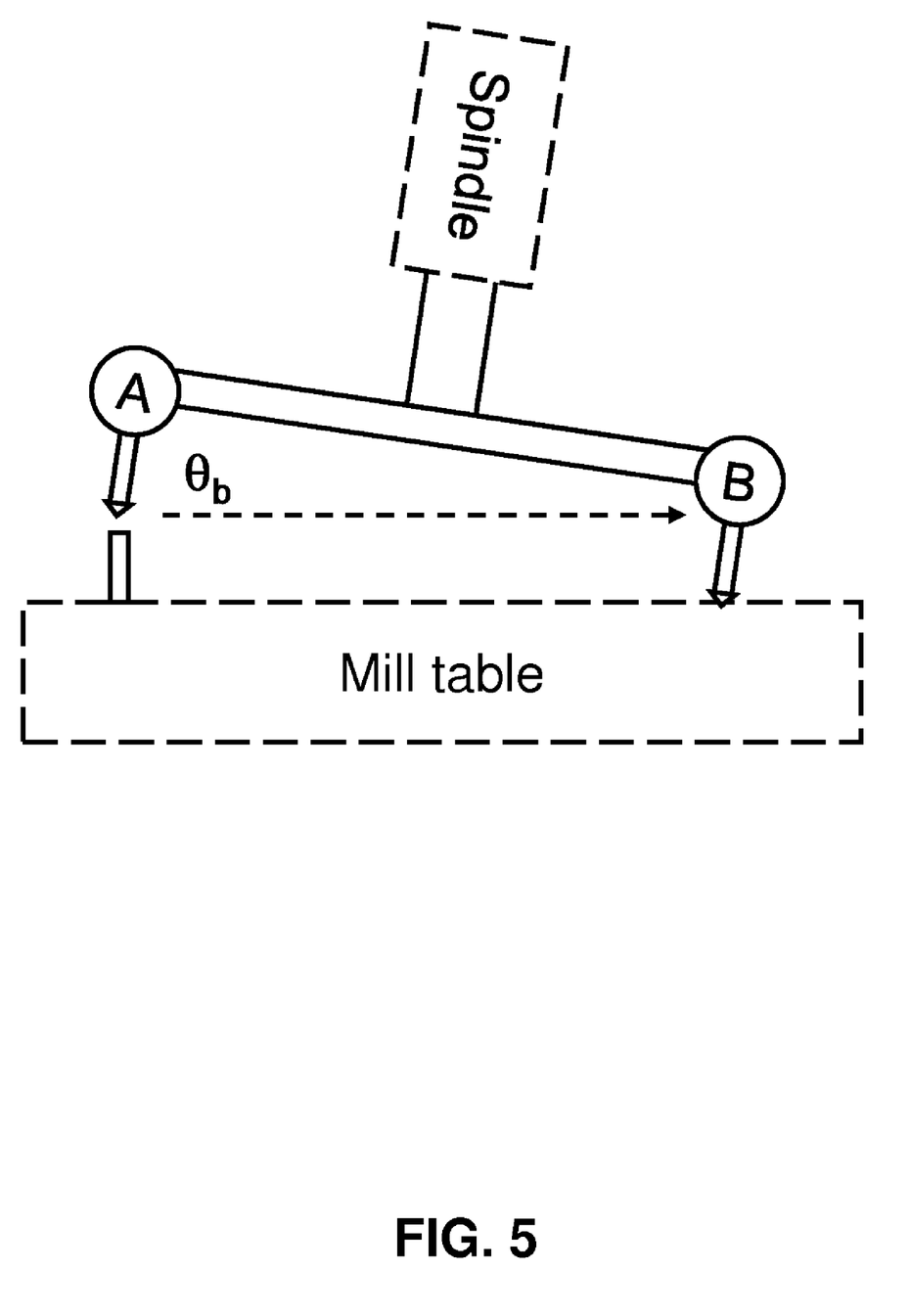
FIG. 5 is a schematic representation of an embodiment where the indicator shank length exceeds the calibration magnet length.

FIG. 5 is a schematic representation of an embodiment where the indicator shank length exceeds the calibration magnet length. In the shown embodiment, the body shank is offset in the spindle. The offset may be caused by a burr in the collet of the spindle or may simply be the result of a less than perfect placement of the shank into the spindle. In either case, there results an angle theta b or θb from the shank body to the plane of the mill head (shown horizontally in this embodiment). Where there is no offset of the body shank in the spindle, the angle theta is zero. This offset angle theta will prevent indicator A from touching the top of a calibration magnet that is shorter than the indicator shank. Because the shank of indicator B bottoms out on the mill table surface, calibration is impossible unless the length of the calibration magnet exceeds the length of the indicator shank. Accordingly, the length of the calibration magnet should exceed the length of both indicator shanks to prevent this from occurring.

Figure 6:
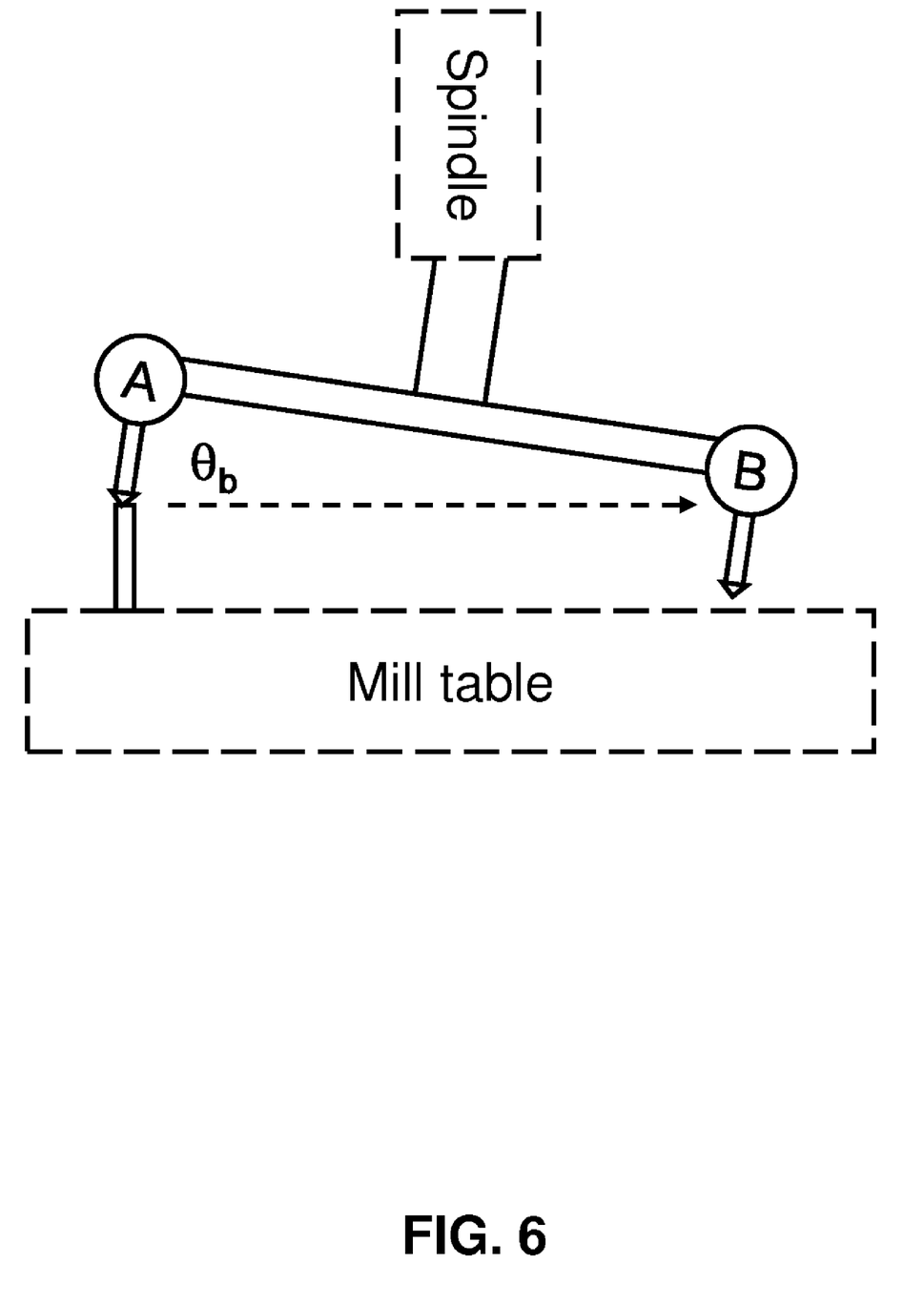
FIG. 6 is a schematic representation of an embodiment where a body shank is offset in the spindle and the calibration magnet is properly sized.

FIG. 6 is a schematic representation of an embodiment where a body shank is offset in the spindle and the calibration magnet is properly sized. It is a claimed element of the disclosure that accurate tramming may be performed even when the body is offset in the spindle, either intentionally or inadvertently. Both indicators may be calibrated quickly to the calibration magnet top and then the mill head may be adjusted until it is orthogonal to the tool body offset within the spindle.

Figure 7:
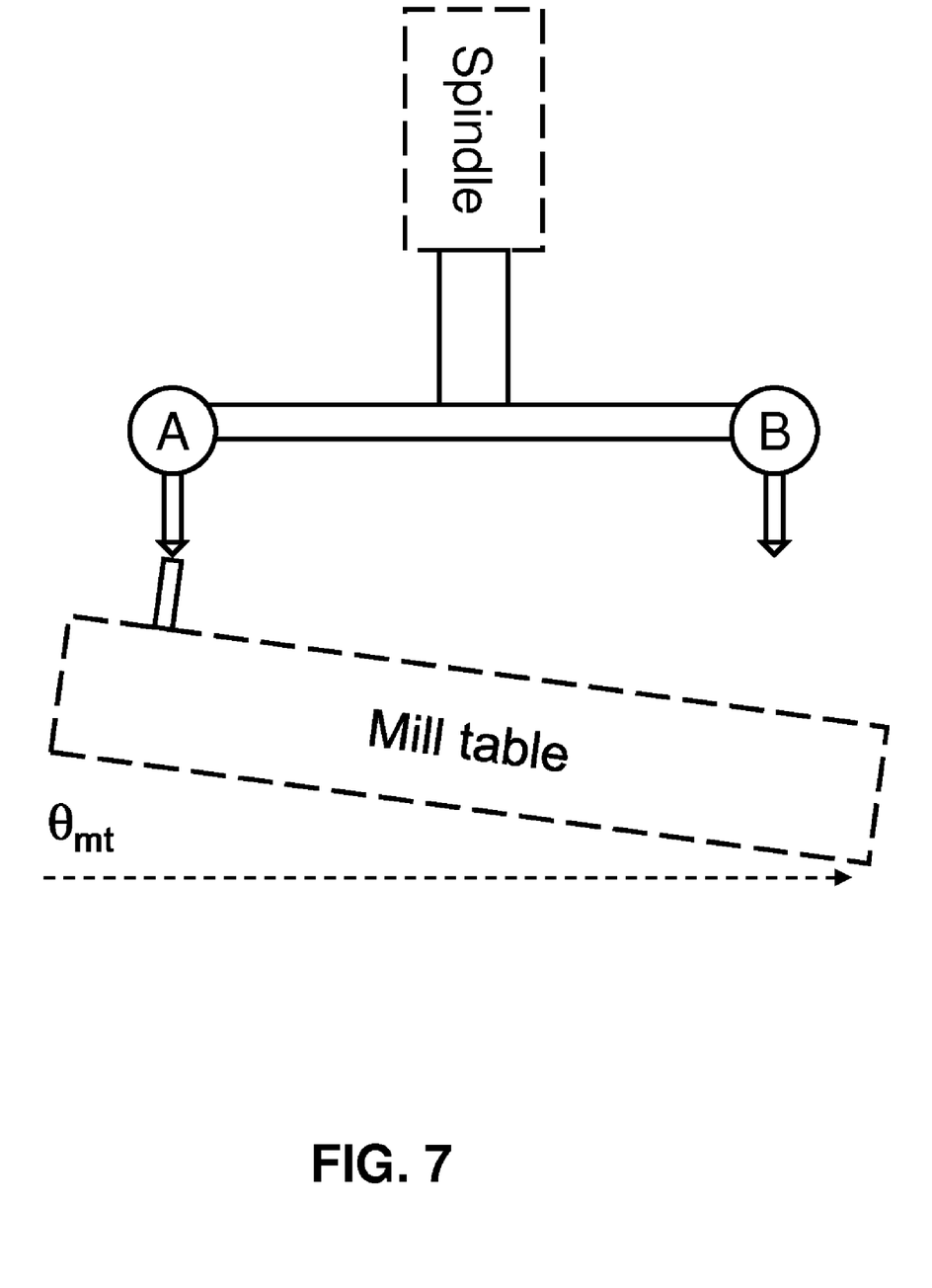
FIG. 7 is a schematic representation of an embodiment where the mill table is offset at a non-orthogonal angle to the spindle.

FIG. 7 is a schematic representation of an embodiment where the mill table is offset at a non-orthogonal angle θmt to the spindle. The offset may be set intentionally in a vise on the mill table (not shown) to control the work product upon the mill table. Alternatively, the mill head may be offset as a result of worn mill head controls or lack of initial tramming and/or maintenance tramming during operation. In either case it is a claimed element of the disclosure that accurate tramming can be performed with the disclosed system and method even when the mill table and/or a vise fixed thereon is non-orthogonal to the spindle central axis.

Previously disclosed calibration techniques use only a plate or gauge block for calibration which can not guarantee that any point on its face will calibrate all gauges equally. The disclosed calibration device or magnet is fixed in place to the mill table and has a small surface or point so that the zeroing of one gauge will be identical to the zeroing of the second gauge even if the mill head is not initially trammed. The disclosed methods are quick because only one concurrent measurement of each indicator is necessary as opposed to multiple measurements one-by-one across the face of a calibration plate disposed on the mill table or across the face of the mill table itself. It is precisely for this same reason that the disclosed methods are also more accurate. That is, a single point is more reproducible from the calibration of one gauge to the calibration of another on the same exact point of reference.

Other aspects and advantages of embodiments of the present invention will become apparent to those skilled in the art from the foregoing description, taken in conjunction with the accompanying drawings, illustrated by way of example of the principles of the disclosure.

What is claimed is:

1. A system for quick and accurate tramming of a milling machine head and spindle to a mill table, comprising:
   a) a plurality of arm-like extensions from a perpendicular body shank received into the spindle, each extension configured to receive a backside of an indicator affixed into a recess thereof, a frontside of each indicator having an indicating face; and
   b) a magnetic calibration device configured to magnetically adhere on the mill table, the device configured to provide a single fixed point of calibration for each indicator received in the apparatus.

2. The system for quick and accurate tramming of claim 1, wherein the plurality of indicators comprise a pair of indicators spaced 180 degrees apart in a plane perpendicular to the body shank.

3. The system for quick and accurate tramming of claim 1, wherein the plurality of indicators comprise three indicators equidistantly spaced 120 degrees in a plane perpendicular to the body shank.

4. The system for quick and accurate tramming of claim 1, wherein the indicator is a mechanical device configured to measure a precise distance via a physical extension of an indicator shank to a disparate surface.

5. The system for quick and accurate tramming of claim 1, wherein the indicator is a laser device configured to measure a precise distance via a laser extending from the indicator atop a disparate surface.

6. The system for quick and accurate tramming of claim 5, wherein a height of the calibration device exceeds a length of the indicator extension.

7. The system for quick and accurate tramming of claim 1, wherein the indicator is an electromechanical device configured to measure a precise distance from the apparatus extension to a disparate surface.

8. The system for quick and accurate tramming of claim 1, wherein the calibration device is a magnet configured as a puck, a pyramid, a cone and any other arcuate and geometrical configuration approximating a single point.

9. The system for quick and accurate tramming of claim 1, wherein a distance from a centerline of a first indicator to a centerline of the spindle is substantially equal to a distance from a centerline of a second indicator to the centerline of the spindle.

10. The system for quick and accurate tramming of claim 9, wherein the distance from a centerline of a first and second indicator to the centerline of the spindle is approximately 5 inches.

11. The system for quick and accurate tramming of claim 1, wherein the body shank is approximately one half inches in diameter.

12. A method for quick and accurate tramming of a mill head and spindle to a mill table, comprising:
   a) disposing an apparatus body shank into the spindle and a magnetically adhering calibration device onto the mill table, the apparatus body comprising a plurality of indicators spaced apart in a plane perpendicular to the body shank and connected thereto;
   b) calibrating the indicators one at a time by positioning a shank tip of an indicator at a single fixed point atop the calibration device and adjusting the indicator to read a calibration value common to all the indicators; and
   c) moving the spindle toward the mill table surface until at least one indicator tip touches the mill table and adjusting the mill head until all the indicator tips touch the mill table and all indicators read a same value.

13. The method for quick and accurate tramming of claim 12, wherein the plurality of indicators comprise three indicators spaced 120 degrees apart in a plane perpendicular to the body shank.

14. The method for quick and accurate tramming of claim 12, further comprising:
   reposing the calibration device a radial distance from a centerline of the spindle 90 degrees from a prior placement; and
   repeating the steps b) and c) to tram the millhead in a second plane perpendicular to the mill table.

15. The method for quick and accurate tramming of claim 12, wherein the calibration value read for all indicators is zero with a repeatability tolerance of plus or minus 0.0002 inches.

16. The method for quick and accurate tramming of claim 12, further comprising subsequently adjusting the mill head so that at least one indicator reads a predetermined non-calibration value for a predetermined mill head surface angle with respect to a center line of the spindle.

17. The method for quick and accurate tramming of claim 16, further comprising configuring the surface angle with respect to the center line of the spindle by using the conventional sine rule.

18. The method for quick and accurate tramming of claim 12, wherein calibrating the indicators in step b) further comprises canceling out any offset of the indicator in the apparatus body, such as an offset resulting from a bent indicator shank, by adjusting all indicators to read the same calibrating value.

19. A device configured for use with a plurality of indicators spaced apart in a plane perpendicular to a body shank and connected thereto, the body shank configured to be received into a spindle for tramming of a milling machine head and spindle to a mill table, the device comprising a body configured to magnetically adhere on the mill table, a top surface of the device approximating a single fixed point of calibration for each indicator and a bottom surface of the device configured to magnetically adhere on the mill table.

20. A device for quick and accurate tramming of a milling machine head and spindle to a mill table, comprising a plurality of arm-like extensions from a perpendicular body shank received into the spindle, each extension configured to receive a backside of an indicator affixed into a recess thereof, a frontside of each indicator having an indicating face.

* * * * *